Oct. 12, 1926. 1,603,134
J. V. MARTIN
AEROPLANE PROPULSION INSTALLATION
Original Filed March 5, 1921 2 Sheets-Sheet 1
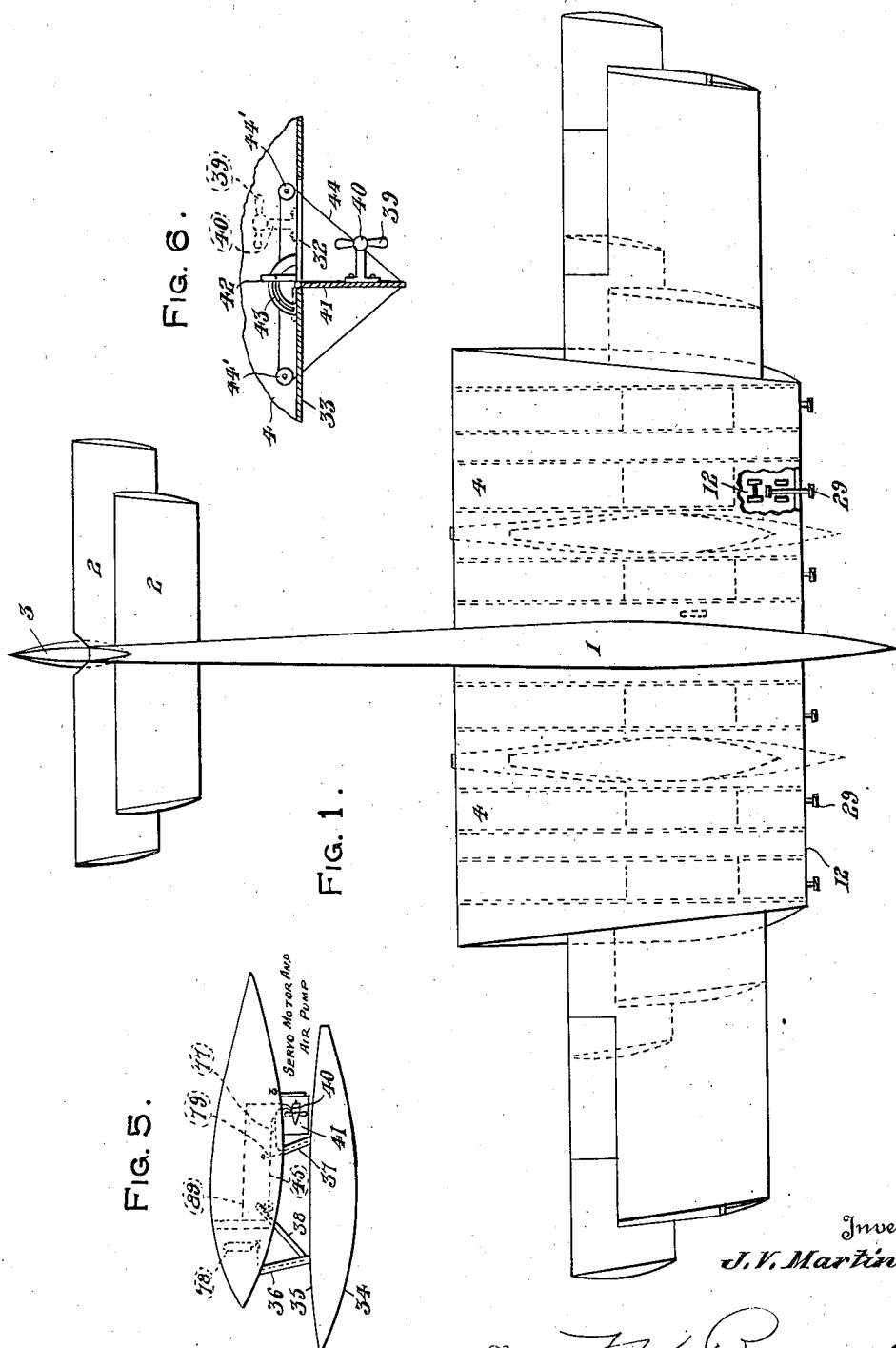
Inventor
J. V. Martin
By J. K. Bryant
Attorney Oct. 12, 1926.　　　　　　　　　　　　　　　　　　　1,603,134
J. V. MARTIN
AEROPLANE PROPULSION INSTALLATION
Original Filed March 5, 1921　　2 Sheets-Sheet 2
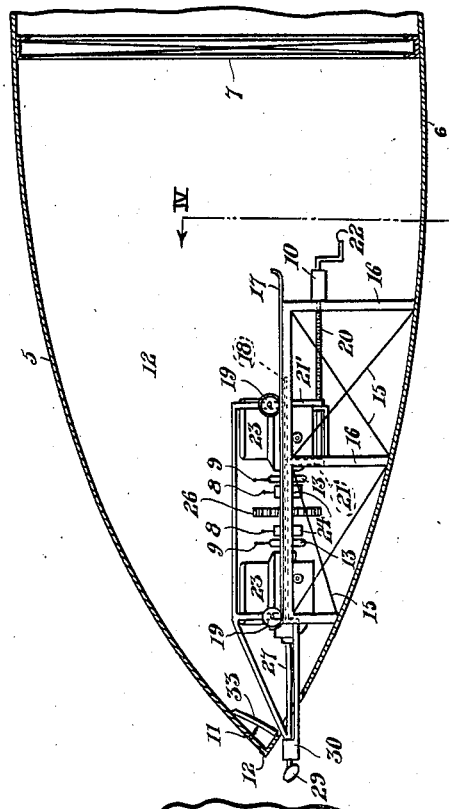
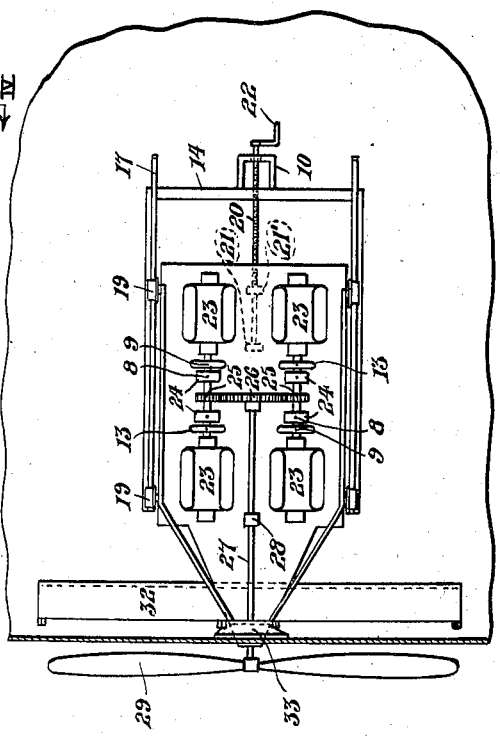
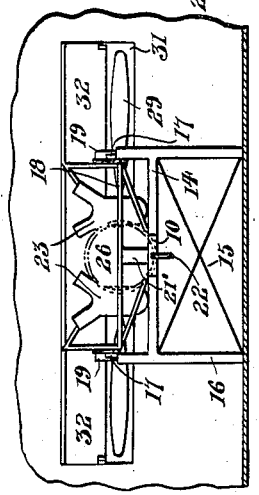
Inventor
J. V. Martin
By J. K. L. Bryant
Attorney Patented Oct. 12, 1926.

1,603,134

UNITED STATES PATENT OFFICE.

JAMES V. MARTIN, OF GARDEN CITY, NEW YORK.

AEROPLANE PROPULSION INSTALLATION.

Original application filed March 5, 1921, Serial No. 450,034. Divided and this application filed December 16, 1921. Serial No. 522,877.

The primary object of the invention is the provision of aeroplane propulsion means housed within the wing of the craft and including a propeller retractible within the wing during flight in order to repair, replace or reduce the resistance of said propeller.

A further object of the invention is to dispose a power unit or units within an aeroplane wing in such relation to the wing truss as not to weaken the same and at the same time to provide both a wing and a motor truss which permit accessibility of the motors for control, inspection and repair during flight.

A further object of the invention is the provision of means for varying the propeller velocity during flight as for instance, at high altitudes and whenever the occasion may require.

A further object of the invention is to provide an aeroplane propulsion unit consisting of multiple power units rigidly mounted upon a common support and said power units arranged either individually or in groups to be operatively disengaged from driving connection with the said aeroplane propulsion unit.

These and other objects of the invention will become apparent from the following detail disclosure in connection with the accompanying drawings, but throughout the invention, there is one consistent purpose, i. e., to so modify and adapt the essential elements of a wing and those of the elements which are housed within the wing that a practical and efficient aeroplane will result, and as the relative motions of the parts housed within the wing are accomplished during flight, thus altering the stresses of the wing structure and changing the aeroplane balance, it is essential that the internal wing structure be embodied in practical proportions and designed to care for these and other problems which may be presented.

Figure 1 is a top plan view of an aeroplane constructed in accordance with the present invention with one wing partially broken away, showing the retractible and transversely positioned propellers and the driving motors therefor, Figure 2 is a detail sectional view of the forward end of the aerofoil showing the track supported carriage with the driving motors and transmission for the propeller shaft mounted on the carriage and adapted for movement on the track to draw the propeller shaft and propeller blade into the aerofoil.

Figure 3 is a detail sectional view of the forward end of the aerofoil showing the track supported carriage in top plan with the driving motors and transmission mounted thereon, Figure 4 is a detail sectional view taken on line IV—IV of Fig. 2, showing in rear elevation, driving motors for the propeller with the hinged doors in the forward end of the aerofoil moved to open positions to permit passage therethrough of the propeller shaft and propeller.

Figure 5 shows the provision of a retractible servo motor installed upon the wing and Figure 6 is a vertical sectional view thereof with the propeller illustrated by dotted lines in its closed position retracted within the skin of the wing.

The construction of the aeroplane shown is fully described in detail in my copending application entitled Aeroplane wing structure, filed March 5, 1921, Serial No. 450,034, and of which this application is a division. The same provides for a main plane or aerofoil of hollow formation with the upper and lower surfaces suitably braced by ribs and wing bars, driving transmissions for a plurality of propellers being arranged transversely of the aerofoil section. The invention further provides for a plurality of motors operatively associated with each propeller, the motors and their propellers being shiftably mounted within the aerofoil for retracting and projecting the propeller blades relative to the aerofoil for repair or replacement.

Describing the invention more in detail, and with particular reference to Fig. 1, there is illustrated an aeroplane embodying a centrally positioned fuselage 1 with the usual empennage thereof including a pair of operable elevating and lowering transverse planes 2 and a vertical rudder 3, these elements being operable from within the fuselage at a convenient point.

A main plane or aerofoil section 4 of hollow construction carries the fuselage 1. The said main plane embodies a compartment 12 having upper and lower skin surfaces 5 and 6 respectively with the skin walls maintained in spaced relation by the bracing ribs and struts 7, the general design of the aerofoil being such as to provide for the least resistance during flight.

The propulsion of the aeroplane embodies the provision of a plurality of transversely positioned motors within the aerofoil associated with a novel transmission, three operating transmissions and propellers being shown as located at each side of the fuselage 1, but it is intended that this invention should not be limited, as any number of motors or transmissions may be employed, these transmissions being illustrated in the drawings. A rectangular supporting frame work 16 suitably braced as at 15 and firmly secured to the structure 6 of the aerofoil carries track rails 17 on the upper portion thereof upon which a carriage 18 provided with track rollers 19 is mounted. To shift the carriage, an operating screw 20 having a swivelled bearing in the arm 21 and freely extending through the arm 21' depending from the carriage 18 is provided, the screw 20 being threaded through the cross bar 14 of the supporting frame 16 and with an operating handle 22 upon the free end of the screw rod 20, outwardly of a bracket 10. The bracket 10 is carried by the bar 14 with the screw 20 freely passing through the bracket. Any number of motors may be mounted on the carriage or plate 18, four being illustrated by the reference numeral 23 each provided with an independently operable clutch 24 and a gear reducing mechanism 13 with the alined motors 23 at each side of the carriage firmly secured thereto and operatively associated through the gear box and clutch with a pinion 25 which is in mesh with the driven gear 26 carried by the propeller shaft 27 journaled in the brackets 28 on the carriage, while independent self-starting devices are part of each motor.

A propeller blade 29 is fixed to the outer end of each shaft 27 and the forward end of the propeller shaft 27 journaled in the frame 30 as clearly shown in Fig. 2. To provide for the retraction and projection of propeller shaft and blade relative to the aerofoil, the leading edge 12 of the aerofoil, is provided with a transverse opening 31 closed by a sectional door embodying lateral members 32 and a central smaller member 33, all of the door being elevated to an open position when the propeller and shaft are retracted while the central smaller door section 33 is alone open when the propeller blade 29 is projected. A suitable catch 11 being associated with the door section 33 to maintain the same in open position as illustrated in Fig. 2. As shown in Fig. 1 the driving transmissions are arranged transversely of the aerofoil 1 and each motor carriage and propeller is independently operable, one or more of the transmissions being capable of retraction within the aerofoil while the remaining transmissions are in operation, while, by the provision of the independent clutch devices 24 for the several motors 23 associated with each propeller 29, any one of the series of motors 23 for each propeller 29 may be thrown out of operation at any time for purposes of repair, or otherwise, without the necessity of retracting the associated propeller blade 29 into the aerofoil 4, or without rendering the same inoperative, and the gear attending mechanism 13 will permit the relative change of speed between the motors and propeller shafts.

The propeller shaft 27 of a power unit may be operated by one or more of the four motors 23 of that unit for instance, two motors 23 upon one side of the shaft 27 may be utilized or a single motor 23 upon the opposite sides of the shaft 27. Should one of the motors 23 become disabled or inefficient for any reason, the same may be thrown out of operative connection with its respective pinion 25 by means of the clutch lever 8 of the clutch member 24 of that motor while the gear mechanism 13 of the motor may then be set at neutral by means of the gear shift lever 9 of that motor. Any or all of the six propellers 29 herein illustrated in Fig. 1 may be utilized for propulsion purposes and the manner of retracting any of such propellers 29 through the adjacent opening 31 of the wing 4 will be apparent for the purposes herein set forth. The method of stopping the propeller in any desired position will be obvious, since the hand levers 8 of clutch 24 may be used as a brake to stop the propeller and in addition the same may be manually manipulated through the door 32.

The propellers being independently operable as above described may be selectively withdrawn into the aerofoil 4 at will and the doors 32—33 for the slotted openings 31 may be closed and secured in any preferred manner.

It will be observed that the carriage 18 may be quickly disengaged from the aeroplane structure 16 by loosening the worm shaft 20 and removing the small rollers under the rail 17 as shown in Fig. 2. By adjusting the relative size of the opening 31 and the motor carriage 18 the entire power plant may be conveniently removed from the plane and another substituted.

While there are herein shown and described the preferred embodiments of the invention, it is nevertheless to be understood that changes may be made without departing from the spirit and scope of the invention as claimed.

In Figures 5 and 6 there is illustrated a servo motor 40 consisting of propeller-shaped blades 39 and mounted upon a hinged panel 41 beneath the lower skin 33 of the wing 4, the panel 41 being adapted for closing the opening 32 in the skin 33 when the motor 40 is not in use as illustrated by dotted lines, in Figure 6. A panel 41 is opened or closed by suitable cords 44 passing over pulleys 44' within the wing 4 and extending to convenient points of access by the aviator.

The functions of a servo motor being well understood and forming no part of this application will not be described, the use of the motor 40 being for instance to operate an air pump for filling the tank 78 with compressed air for various purposes, such as inflating the pontoon 34 through the top 5 thereof and connected with the wing 4 by the foldable struts 36 and 37, the pontoon being retracted by the rack 38. Air conduits from the motor 40 may lead to different points in the aeroplane, such as the conduits 45, 77 and 89.

A guard rack for the folding panel 41 is provided at 42 and 43 while a valve 79 is conveniently positioned for deflating the pontoon 34.

What I claim is:—

1. The combination with the wing of an aeroplane, of a propeller shaft normally projecting from said wing, a propeller upon the outer end of said shaft, and means for retracting the shaft and propeller within said wing.

2. The combination with the wing of an aeroplane, of a propeller adapted to be retracted within said wing during flight and means within the wing for retracting the said propeller into the wing.

3. In combination with an aeroplane wing, a power plant housed within said wing, a propeller shaft projecting from said wing and a propeller arranged on the outer end of said shaft, said wing having an opening therein adapted to permit inspection of the propeller from a point within said wing.

4. In combination with an aeroplane wing, power means located therein, a propeller located exteriorly of the wing, means for transmitting power from said power means to the propeller, and means for withdrawing said propeller into said wing.

5. In combination with an aeroplane wing, a plurality of power units mounted upon a common base within said wing, a propeller shaft driven thereby, means for selectively effecting connection between the power units and propeller shaft, and the disposition and support of said power units arranged within the wing to provide accessibility for inspection and repair during flight.

6. In combination with an aeroplane wing, a plurality of power units rigidly attached to a common base, a propeller shaft, means for independently engaging the power units with said shaft, and a frame work supporting said shaft and base within the wing.

7. The combination with an aeroplane wing, of a plurality of power units, and a propeller shaft all rigidly secured to a common base, independent means for connecting each power unit with said shaft and means for controlling each of said power units and a trussed framework between said base and the internal wing structure.

8. The combination with the internal structure of an aeroplane wing, a power unit, and a propeller shaft mounted on a common base, supports for said base and power unit attached to the internal wing structure, and means for controlling said power unit, including spaces adjacent the said power unit for occupancy by an engineer.

9. The combination within an aeroplane wing, of a plurality of power units, and a propeller shaft mounted on a common base, means for connecting each power unit to said shaft and means for moving said shaft in a general horizontal plane relative to the wing structure.

10. The combination with an aeroplane wing, of four internally positioned aeroplane motors grouped about a common propeller shaft provided with a spur gear and engaging means including a common spur gear for each pair of motors, said common gear meshing with said propeller shaft gear between each motor and the said spur gear.

11. The combination with an aeroplane wing, of an internally positioned power unit, an externally positioned propeller and means to retract the said propeller within the said wing.

12. In combination with aeroplane power unit installation, a power unit securely mounted upon a power unit support within the inclosed portions of the said aeroplane, readily detachable means connecting the said support to the framework of the aeroplane and a door arranged in the external surface of the said aeroplane adjacent the said support.

13. The combination with an aeroplane wing, of a plurality of power units, an aeroplane propeller, means for transmitting power from said units through the wing covering to drive the said propeller and means for retracting the said propeller within the said wing covering.

14. The combination with an aeroplane wing, of a plurality of power units housed therein and firmly mounted on a common base, a propeller shaft, engaging means between the said power units and the said shaft, and means for varying during flight the number of revolutions of the said propeller shaft relative to the said power unit.

15. In combination with an aeroplane, an opening therein, a propeller, means to retract the said propeller through said opening into the enclosed portions of said aeroplane, and means to close the said opening.

16. In combination with an aeroplane wing having an opening therein, a propeller carried by said wing and adapted to be retracted thereinto through said opening, and means for closing said opening.

17. In an aeroplane the combination of a propeller shaft, power units mounted upon a common support, engaging means between each power unit and the said propeller shaft, reduction gear between each power unit and the said propeller shaft and a means distinct from said last means to alter the relational speeds between each of the said power units and the said propeller shaft.

18. Within an aeroplane wing the combination of a propeller shaft, a mounting for said shaft, multiple power unit groups mounted securely upon the said mounting, disengaging means between each of the power unit groups and the said propeller shaft and the said mounting providing a single rigid support for all the elements enumerated herein.

19. In combination within the enclosed portions of an aeroplane, a power unit crank case mounted on a trussed support and said support firmly attached to the structure of the said aeroplane, within the internal skin thereof and readily detachable means for detaching the said support from the said structure.

20. In combination within the inclosed portions of an aeroplane, a propeller shaft drive, multiple power units mounted firmly upon a single horizontal base, said base removable as a unit from the aeroplane, means to firmly secure the said base to the said aeroplane and selective disengaging means between each said power unit and the said drive.

In testimony whereof I affix my signature.

JAMES V. MARTIN.